(12) United States Patent
Ryu et al.

(10) Patent No.: US 12,533,813 B2
(45) Date of Patent: Jan. 27, 2026

(54) ROBOT, SYSTEM COMPRISING ROBOT AND USER DEVICE AND CONTROLLING METHOD THEREOF

(71) Applicant: Samsung Electronics Co., Ltd., Suwon-si (KR)

(72) Inventors: Minwoo Ryu, Suwon-si (KR); Donghun Lee, Suwon-si (KR); Shin Kim, Suwon-si (KR); Euiyoung Chang, Suwon-si (KR); Changho Ha, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 312 days.

(21) Appl. No.: 17/570,896

(22) Filed: Jan. 7, 2022

(65) Prior Publication Data

US 2022/0331968 A1    Oct. 20, 2022

Related U.S. Application Data

(63) Continuation of application No. PCT/KR2021/020131, filed on Dec. 29, 2021.

(30) Foreign Application Priority Data

Apr. 20, 2021  (KR) .......................... 10-2021-0051398
Sep. 15, 2021  (KR) .......................... 10-2021-0123283

(51) Int. Cl.
*B25J 9/16* (2006.01)
*G05D 1/00* (2024.01)

(52) U.S. Cl.
CPC .......... *B25J 9/1692* (2013.01); *G05D 1/0212* (2013.01)

(58) Field of Classification Search
CPC ...... B25J 9/1692; G01S 17/08; G01S 17/931; G05B 2219/37008; G05D 1/0251
See application file for complete search history.

(56) References Cited

U.S. PATENT DOCUMENTS 7,373,270 B2   5/2008   Ohashi et al.
9,842,396 B2   12/2017  Kim
(Continued)

FOREIGN PATENT DOCUMENTS

JP    2004-355208 A    12/2004
JP    2018-185203 A    11/2018
(Continued)

OTHER PUBLICATIONS

International Search report and written opinion dated Apr. 5, 2022, issued in International Application No. PCT/KR2021/020131.
(Continued)

*Primary Examiner* — Wade Miles
*Assistant Examiner* — Mohammed Yousef Abuelhawa
(74) *Attorney, Agent, or Firm* — Jefferson IP Law, LLP

(57) ABSTRACT

A robot is provided. The robot includes a plurality of sensors, a memory, a driving unit, and a processor configured to, based on identifying that a predetermined event occurs, control the driving unit to move the robot to a predetermined point, based on identifying that the robot has moved to the point, obtain a plurality of images through the sensors, identify whether to perform calibration for at least one sensor based on the obtained images, based on identifying to perform the calibration for the sensor, obtain calibration data for calibrating sensing data corresponding to the sensor based on the obtained images and store the obtained calibration data in the memory, based on the sensing data being obtained from the sensor, calibrate the obtained sensing data based on the calibration data stored in (Continued)

the memory, and control the driving unit based on the calibrated sensing data.

20 Claims, 16 Drawing Sheets

(56) References Cited

U.S. PATENT DOCUMENTS

| | | | |
|---|---|---|---|
| 10,531,073 B2 | 1/2020 | Ovsiannikov | |
| 10,853,942 B1* | 12/2020 | Boyd | G06T 7/80 |
| 10,916,035 B1* | 2/2021 | Kroeger | G05D 1/0212 |
| 2009/0259337 A1 | 10/2009 | Harrold et al. | |
| 2015/0381892 A1 | 12/2015 | Kim | |
| 2018/0039275 A1* | 2/2018 | Yun | A47L 9/2884 |
| 2018/0224862 A1* | 8/2018 | Akazawa | B25J 5/007 |
| 2019/0058811 A1* | 2/2019 | Douady-Pleven | H04N 1/3876 |
| 2019/0146517 A1* | 5/2019 | Ryu | G06T 7/73 701/28 |
| 2020/0089970 A1 | 3/2020 | Lee et al. | |
| 2020/0117210 A1* | 4/2020 | Ren | G05D 1/0212 |
| 2021/0003684 A1* | 1/2021 | Gong | G01S 17/86 |
| 2021/0173055 A1* | 6/2021 | Jian | G01S 7/4808 |
| 2021/0215811 A1* | 7/2021 | Couture | G05D 1/628 |
| 2021/0229290 A1* | 7/2021 | Kume | B25J 9/1692 |
| 2022/0047135 A1* | 2/2022 | Lee | A47L 11/4066 |
| 2022/0155791 A1 | 5/2022 | Lee et al. | |

FOREIGN PATENT DOCUMENTS

| | | |
|---|---|---|
| JP | 2019-205066 A | 11/2019 |
| KR | 10-2010-0119442 A | 11/2010 |
| KR | 10-1297677 B1 | 8/2013 |
| KR | 10-2016-0002160 A | 1/2016 |
| KR | 10-2018-0007263 A | 1/2018 |
| KR | 10-2019-0055329 A | 5/2019 |
| KR | 10-2020-0101760 A | 8/2020 |
| WO | 2020/264089 A1 | 12/2020 |

OTHER PUBLICATIONS

European Search Report dated Jun. 17, 2024, issued in European Application No. 21938051.6.
European Examination Report dated Nov. 8, 2024, issued in European Application No. 21938051.6.

* cited by examiner

ROBOT, SYSTEM COMPRISING ROBOT AND USER DEVICE AND CONTROLLING METHOD THEREOF

CROSS-REFERENCE TO RELATED APPLICATION(S)

This application is a continuation application claiming priority under § 365(c), of an International application No. PCT/KR2021/020131, filed on Dec. 29, 2021, which is based on and claims the benefit of a Korean patent application number 10-2021-0051398, filed on Apr. 20, 2021, in the Korean Intellectual Property Office, and of a Korean patent application number 10-2021-0123283, filed on Sep. 15, 2021, in the Korean Intellectual Property Office, the disclosure of each of which is incorporated by reference herein in its entirety.

BACKGROUND

1. Field

The disclosure relates to a robot including a plurality of sensors. More particularly, the disclosure relates to a system including a robot and a user terminal, and a controlling method thereof.

2. Description of the Related Art

In recent years, a technology for a robot that is disposed in an indoor space to provide services to a user has been actively developed. Particularly, the robot for cleaning an indoor space may identify surrounding objects through a plurality of sensors and provide a service based on information on the identified object.

However, the plurality of sensors provided in the robot may be deteriorated in its performance due to mechanical distortion due to an external physical impact or superannuating. The robot of the related art does not have a function of calibrating the performance, even in a case where the performance of the sensor is deteriorated, and accordingly, a decrease in quality of the service provided by the robot may not be prevented.

Therefore, there is constant demands for the robot that continuously performs calibration for at least one sensor of a plurality of sensors and provides high-quality services.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a robot that moves to a predetermined point after a predetermined event has occurred, and performs calibration for at least one sensor of a plurality of sensors, and a controlling method thereof.

Additional aspects will be set forth in part in the description which follows and, in part, will be apparent from the description, or may be learned by practice of the presented embodiments.

In accordance with an aspect of the disclosure, a robot is provided. The robot includes a plurality of sensors, a memory, a driving unit, and a processor configured to, based on identifying that a predetermined event has occurred, control the driving unit so that the robot moves to a predetermined point, based on identifying that the robot has moved to the predetermined point, obtain a plurality of images through the plurality of sensors, identify whether it is necessary to perform calibration for at least one sensor of the plurality of sensors based on the plurality of obtained images, based on identifying that it is necessary to perform the calibration for the at least one sensor, obtain calibration data for calibrating sensing data corresponding to the at least one sensor based on the plurality of images and store the obtained calibration data in the memory, based on the sensing data being obtained from the at least one sensor, calibrate the obtained sensing data based on the calibration data stored in the memory, and control the driving unit based on the calibrated sensing data.

The processor may be configured to identify whether there is a mechanical distortion on each of the plurality of sensors based on the plurality of obtained images, and based on identifying that there is the mechanical distortion on the at least one sensor of the plurality of sensors, identify that it is necessary to perform calibration for the at least one sensor.

The memory may store a reference image related to the predetermined point, and the processor may be configured to obtain a depth image based on the plurality of obtained images, compare the reference image with the obtained depth image, and identify whether it is necessary to perform the calibration for the at least one sensor of the plurality of sensors based on the comparison result.

The processor may be configured to, based on identifying that a predetermined time interval or an interval in which a predetermined number of tasks has been performed has arrived, identify that the predetermined event has occurred.

The processor may be configured to, based on identifying that the robot has docked at a charge station, identify that the robot has moved to the predetermined point.

The robot may further include a distance sensor, and the processor may be configured to identify whether a dynamic object exists in a surrounding environment of the predetermined point based on sensing data obtained by the distance sensor, after identifying that the robot has moved to the predetermined point, and based on identifying that the dynamic object exists, finish a calibration operation for the plurality of sensors.

The robot may further include a user interface, and a communication interface, and the processor may be configured to, based on a user command being received through at least one of the user interface or the communication interface, control the driving unit so that the robot moves to the predetermined point.

The processor may be configured to, based on the calibration data being obtained, additionally obtain sensing data from the at least one sensor, obtain calibrated sensing data by applying the calibration data to the additionally obtained sensing data, and based on identifying that the calibrated sensing data is improved than the sensing data by a threshold value or more, store the obtained calibration data in the memory.

The processor may be configured to, based on an event in which a traveling mode of the robot is changed occurring after identifying that the robot has moved to the predetermined point, finish a calibration operation for the plurality of sensors.

In accordance with another aspect of the disclosure, a system is provided. The system includes a robot including a plurality of sensors, and a user terminal, the system including the user terminal configured to, based on a user command for performing calibration for the sensors provided in the robot being input, transmit the user command to the robot, and the robot configured to, based on the user command being received from the user terminal, identify whether it is necessary to perform calibration for at least one sensor of the plurality of sensors based on a plurality of images obtained from the plurality of sensors while the robot moves to a predetermined point and is located at the predetermined point, based on identifying that it is necessary to perform the calibration for the at least one sensor, obtain calibration data for calibrating sensing data corresponding to the at least one sensor based on the plurality of images and store the obtained calibration data in a memory.

In accordance with another aspect of the disclosure, a method for controlling a robot is provided. The method includes based on identifying that a predetermined event has occurred, moving the robot to a predetermined point, based on identifying that the robot has moved to the predetermined point, obtaining a plurality of images through a plurality of sensors, identifying whether it is necessary to perform calibration for at least one sensor of the plurality of sensors based on the plurality of obtained images, based on identifying that it is necessary to perform the calibration for the at least one sensor, obtaining and storing calibration data for calibrating sensing data corresponding to the at least one sensor based on the plurality of images, based on the sensing data being obtained from the at least one sensor, calibrating the obtained sensing data based on the stored calibration data, and driving the robot based on the calibrated sensing data.

The identifying whether it is necessary to perform the calibration may include identifying whether there is a mechanical distortion on each of the plurality of sensors based on the plurality of obtained images, and based on identifying that there is the mechanical distortion on the at least one sensor of the plurality of sensors, identifying that it is necessary to perform the calibration for the at least one sensor.

The identifying whether it is necessary to perform the calibration may include obtaining a depth image based on the plurality of obtained images, comparing a reference image related to the predetermined point with the obtained depth image, and identifying whether it is necessary to perform the calibration for the at least one sensor of the plurality of sensors based on a comparison result.

The identifying of whether it is necessary to perform the calibration may include, obtaining a depth image based on the plurality of obtained images, identifying a flat surface based on the depth image, and identifying whether it is necessary to perform the calibration for the at least one sensor of the plurality of sensors based on the identified flat surface.

The method may include, identifying the flat surface including a largest number of point clouds within a threshold distance of the robot by repeatedly extracting three random point clouds among a plurality of point clouds included in the depth image, identifying a flat surface including the three extracted point clouds, and calculating a number of point clouds located within the threshold distance from the identified flat surface.

The moving the robot may include, based on identifying that at least one of a predetermined time interval or an interval in which a predetermined number of tasks has been performed has arrived, identifying that the predetermined event has occurred.

The obtaining the plurality of images may include, based on identifying that the robot has docked at a charge station, identifying that the robot has moved to the predetermined point.

According to various embodiments of the disclosure, the robot may obtain sensing data with high reliability and provide a service based thereon, and accordingly, thereby improving user's convenience.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1A:
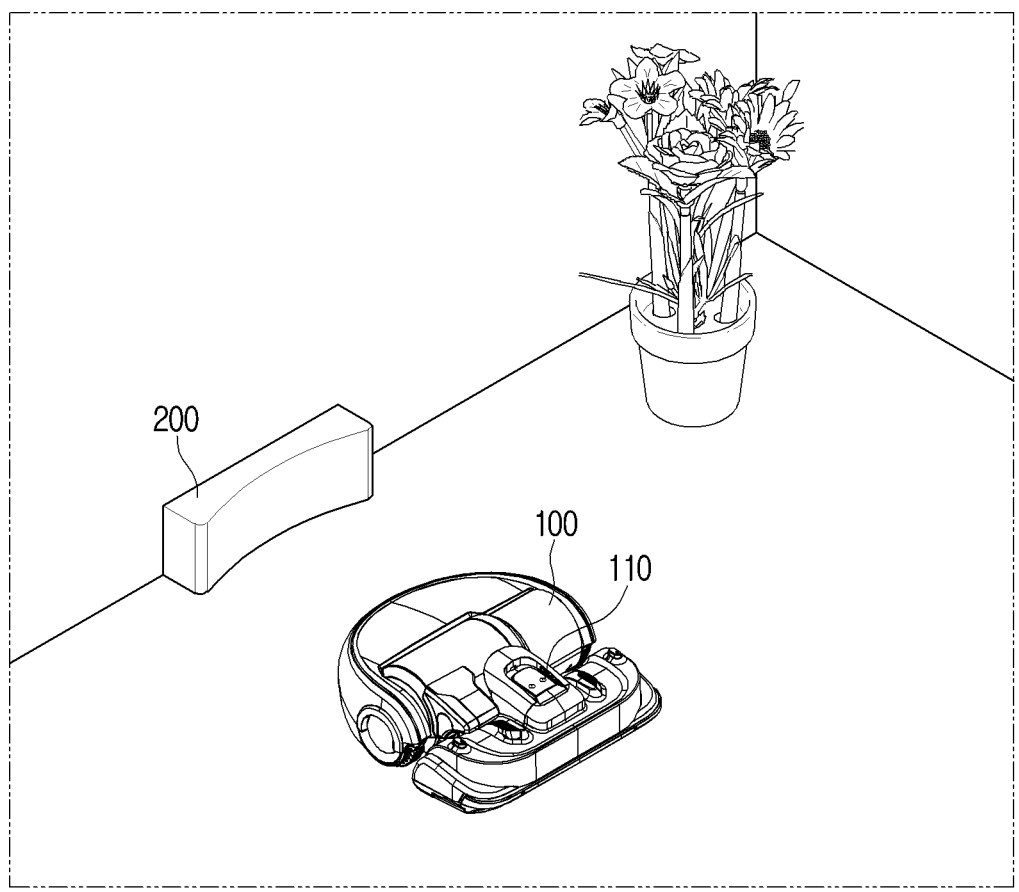
FIGS. 1A and 1B are diagrams illustrating a schematic content related to calibration of a plurality of sensors provided in a robot according to various embodiments of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In this disclosure, the terms such as "comprise", "may comprise", "consist of", or "may consist of" are used herein to designate a presence of corresponding features (e.g., constituent elements such as number, function, operation, or part), and not to preclude a presence of additional features.

It should be understood that the expression such as "at least one of A or/and B" expresses any one of "A", "B", or "at least one of A and B".

The expressions "first," "second" and the like used in the disclosure may denote various elements, regardless of order and/or importance, and may be used to distinguish one element from another, and does not limit the elements.

If it is described that a certain element (e.g., first element) is "operatively or communicatively coupled with/to" or is "connected to" another element (e.g., second element), it should be understood that the certain element may be connected to the other element directly or through still another element (e.g., third element).

It is to be understood that the terms such as "comprise" or "consist of" are used herein to designate a presence of characteristic, number, step, operation, element, part, or a combination thereof, and not to preclude a presence or a possibility of adding one or more of other characteristics, numbers, steps, operations, elements, parts or a combination thereof.

A term such as "module" or a "unit" in the disclosure may perform at least one function or operation, and may be implemented as hardware, software, or a combination of hardware and software. Further, except for when each of a plurality of "modules", "units", and the like needs to be realized in an individual hardware, the components may be integrated in at least one module and be implemented in at least one processor (not illustrated).

A "user" in the disclosure may refer to a person who receives a service from the robot but is not limited thereto.

FIG. 1A is a diagram illustrating an operation of the robot that travels an indoor space according to an embodiment of the disclosure.

Referring to FIG. 1A, a robot 100 according to an embodiment of the disclosure may travel a specific space and provide a service to a user. For example, the robot 100 may provide a service of cleaning a space but is not limited thereto. The robot 100 may provide the service based on data obtained through a sensor 110 and the sensor 110 according to an example may be an optical sensor.

The sensor 110 according to an example may include a plurality of cameras. Since the camera may be deteriorated in its performance due to the mechanical distortion due to an external physical impact and superannuating of the robot 100, the robot 100 may perform calibration for the sensor 110. For example, if it is identified that there is a change in an angle of view of at least one camera among a left camera and a right camera included in the robot 100, the calibration for the corresponding camera may be performed.

The robot 100 may perform the calibration for the sensor 110 in a state of docking at a charge station 200. Herein, the charge station 200 may include a device that supplies power for charging the robot 100 when it is identified that the robot 100 has docked at the charge station 200, but is not limited thereto.

In addition, the robot 100 may obtain calibration data based on an image obtained through at least one camera identified as requiring the calibration, and provide a service based on calibrated sensing data obtained by applying the calibration data to sensing data obtained through the sensor 110.

Figure 1B:
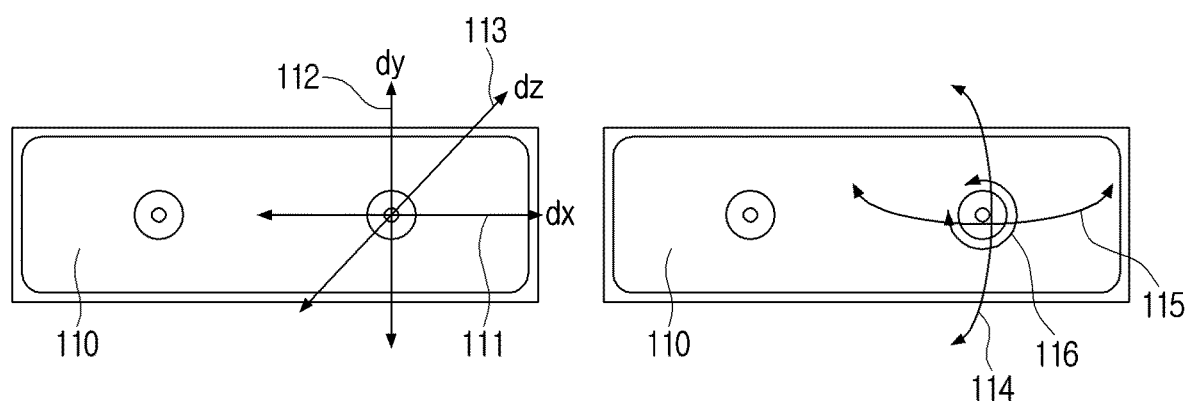

FIG. 1B is a diagram illustrating mechanical distortion of the sensor provided in the robot and the calibration operation thereof according to an embodiment of the disclosure.

Referring to FIG. 1B, the calibration for the sensor 110 will be described by assuming that the sensor 110 is a camera module including a plurality of cameras.

The sensor 110 according to an example may be implemented in a form that two cameras are disposed on a substrate, and the robot 100 may determine whether there is mechanical distortion on any one camera of the two cameras.

Specifically, the robot 100 may determine whether there is mechanical distortion on the remaining camera based on a predetermined camera or a randomly selected camera. Herein, the mechanical distortion may occur due to physical impact applied to the sensor 110, and the mechanical distortion may include various patterns, for example, x axis direction shift 111, y axis direction shift 112, z axis direction shift 113, x axis center rotation 114, y axis center rotation 115, and z axis center rotation 116, but is not limited thereto.

Referring to FIG. 1B, the robot 100 may determine whether there is the mechanical distortion on the right camera based on the left camera. In addition, the robot 100 may store threshold errors corresponding to various patterns included in the mechanical distortion, and the robot 100 may determine whether there is a pattern having an error equal to or more than the threshold error among the various patterns included in the mechanical distortion on the right camera based on two images obtained through the two cameras.

In addition, the robot 100 may store calibration related information corresponding to the various patterns described above, and if it is identified that the right camera has the mechanical distortion, the robot 100 may calibrate the pattern of the mechanical distortion occurred on the right camera based on the calibration related information in terms of software.

Hereinafter, various embodiments of moving to a predetermined point and performing the calibration for at least one sensor of a plurality of sensors after occurrence of a predetermined calibration event will be described in more detail.

Figure 2A:
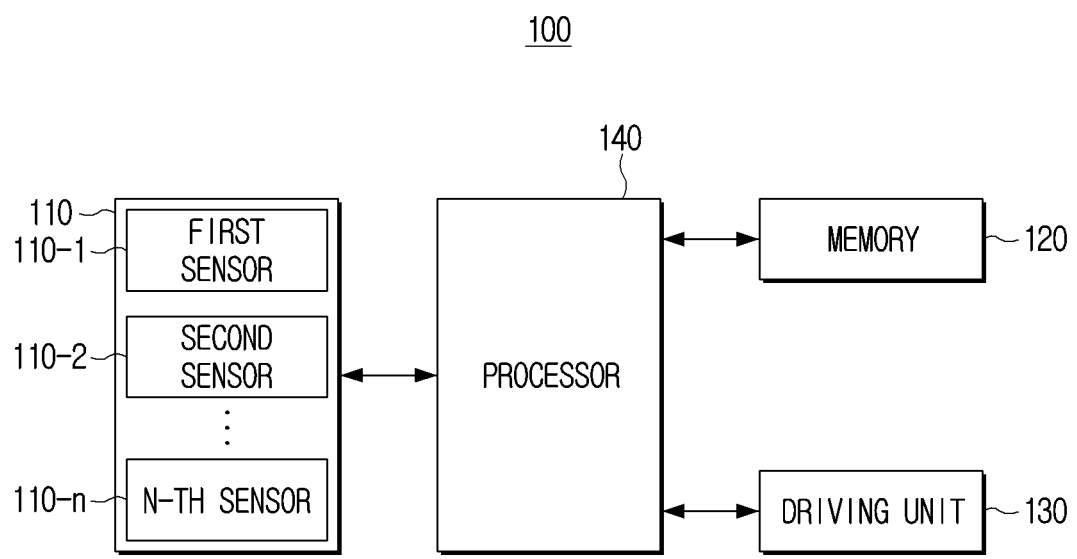
FIG. 2A is a diagram illustrating a configuration of the robot according to an embodiment of the disclosure.

FIG. 2A is a diagram illustrating a configuration of the robot according to an embodiment of the disclosure.

Referring to FIG. 2A, the robot 100 may include a plurality of sensors 110, a memory 120, a driving unit 130, and a processor 140.

The plurality of sensors 110 may include a first sensor 110-1, a second sensor 110-2, etc., to an n-th sensor 110-*n*. Each of the first sensor 110-1 to the n-th sensor 110-*n* may measure physical quantity or detect an operation state of the robot 100 and convert the measured or detected information into an electrical signal. The plurality of sensors 110 may include a camera, and the camera may include a lens which focuses visible light received due to reflection by an object and other optical signals by an image sensor, and the image sensor capable of detecting the visible light and the other optical signals. Herein, the image sensor may include a 2D pixel array divided into a plurality of pixels and the camera according to an example may be implemented as a depth camera.

In addition, the plurality of sensors 110 may include at least one of a microphone, a distance sensor, a gesture sensor, a gyro sensor, a pressure sensor, a magnetic sensor, an acceleration sensor, a grip sensor, a proximity sensor, a color sensor (e.g., red, green, blue (RGB) sensor), a biological sensor, a temperature/humidity sensor, a luminance sensor, or an ultra violet (UV) sensor, in addition to the camera.

The memory 120 may store data necessary for various embodiments of the disclosure. The memory 120 may be implemented in a form of a memory embedded in the robot 100 or implemented in a form of a memory detachable from the robot 100 according to data storage purpose. For example, data for driving the robot 100 may be stored in a memory embedded in the robot 100, and data for an extended function of the robot 100 may be stored in a memory detachable from the robot 100. Meanwhile, the memory embedded in the robot 100 may be implemented as at least one of a volatile memory (e.g., a dynamic random access memory (RAM) (DRAM), a static RAM (SRAM), a synchronous dynamic RAM (SDRAM), or the like), a non-volatile memory (e.g., one time programmable read-only memory (ROM) (OTPROM), a programmable ROM (PROM), an erasable and programmable ROM (EPROM), an electrically erasable and programmable ROM (EEPROM), a mask ROM, a flash ROM, a flash memory (e.g., a NAND flash or a NOR flash), a hard drive or a solid state drive (SSD), and the like. In addition, the memory detachable from the robot 100 may be implemented as a memory card (e.g., a compact flash (CF), a secure digital (SD), a micro secure digital (Micro-SD), a mini secure digital (Mini-SD), extreme digital (xD), a multi-media card (MMC), or the like), an external memory connectable to a universal serial bus (USB) port (e.g., a USB memory), and the like.

The driving unit 130 may be a device capable of allowing the robot 100 to travel. The driving unit 130 may adjust a traveling direction and a traveling speed according to the control of the processor 140 and the driving unit 130 according to an example may include a power generator for generating power for the robot 100 to travel (e.g., a gasoline engine, a diesel engine, a liquefied petroleum gas (LPG) engine, an electrical motor, and the like depending on use of fuel (or energy source)), a steering for adjusting the traveling direction (e.g., manual steering, a hydraulics steering, an electronic control power steering (EPS), and the like), a traveler for allowing the robot 100 to travel according to the power (e.g., a wheel, a propeller, and the like), and the like. Herein, the driving unit 130 may be modified depending on the traveling type (e.g., wheel type, walking type, or flying type) of the robot 100.

The processor 140 generally controls operations of the robot 100. Specifically, the processor 140 may be connected to each constituent element of the robot 100 to generally control the operations of the robot 100. For example, the processor 140 may be connected to the plurality of sensors 110, the memory 120, and the driving unit 130 to control the operations of the robot 100.

According to an embodiment, the processor 140 may be referred to various names such as a digital signal processor (DSP), a microprocessor, a central processing unit (CPU), a Micro Controller Unit (MCU), a micro processing unit (MPU), a Neural Processing Unit (NPU), a controller, an application processor (AP), and the like, but the processor 140 is used in the disclosure.

The processor 140 may be implemented as System on Chip (SoC) or large scale integration (LSI) or may be implemented in form of a field programmable gate array (FPGA). In addition, the processor 140 may include a volatile memory such as an SRAM.

When it is identified that a predetermined event has occurred, the processor 140 according to an embodiment of the disclosure may control the driving unit 130 so that the robot 100 moves to a predetermined point. Herein, the predetermined event may include at least one of an event in which a predetermined calibration interval has arrived after the calibration for the plurality of sensors 110 is performed finally or an event in which a user command for performing the calibration for the plurality of sensors 110 is input, but is not limited thereto.

For example, if it is identified that at least one of a predetermined time interval or an interval in which a predetermined number of tasks has been performed has arrived, the processor 140 may identify that the predetermined event has occurred. For example, if it is identified that the robot 100 performs a task 20 times without performing the calibration for the plurality of sensors 110 or one week has elapsed from the point when the calibration for the plurality of sensors 110 is performed finally, the processor 140 may identify that the predetermined event has occurred and control the driving unit 130 so that the robot 100 moves to the predetermined point.

In addition, if it is identified that the robot 100 has moved to the predetermined point, the processor 140 may obtain a plurality of images through the plurality of sensors 110. For example, if it is identified that the robot 100 is located within a threshold distance from the charge station 200 based on map data stored in the memory 120 or it is identified that the robot 100 has docked at the charge station 200, it is identified that the robot 100 has moved to the predetermined point, and the robot may obtain the plurality of images through the plurality of sensors 110.

In addition, the processor 140 may identify whether the calibration is necessary for at least one sensor of the plurality of sensors 110 based on the plurality of obtained images. For example, the processor 140 may identify whether there is the mechanical distortion on each of the plurality of sensors 110 based on the plurality of images obtained through the plurality of sensors 110, and if it is identified that there is the mechanical distortion on at least one sensor, the processor may identify that it is necessary to perform the calibration for the at least one sensor.

For example, the memory 120 may store a reference image related to the predetermined point, and the processor 140 may obtain a depth image based on the plurality of obtained images, compare the reference image stored in the memory 120 with the obtained depth image, and identify that it is necessary to perform the calibration for at least one sensor of the plurality of sensors 110 based on the comparison result. For example, if a similarity between the reference image and the depth image is equal to or less than a threshold value, the processor 140 may identify that it is necessary to perform the calibration for the at least one sensor.

In addition, if it is identified that it is necessary to perform the calibration for the at least one sensor, the processor 140 may obtain calibration data for calibrating sensing data corresponding to the at least one sensor based on the plurality of images obtained through the plurality of sensors 110 and store the calibration data in the memory 120. Herein, the sensing data may include images obtained by the sensor after obtaining the calibration data, but is not limited thereto.

For example, if a similarity between the depth image obtained by synthesizing the plurality of images obtained by the plurality of sensors 110 while the robot 100 is located at the predetermined point and the reference image related to the predetermined point stored in the memory 120 is equal to or less than the threshold value, the processor 140 may obtain calibration data for calibrating the image obtained through the camera in terms of software and store this in the memory 120.

If first calibration data pre-stored in the memory 120 exists as a result of performing the calibration for the plurality of sensors 110 by the robot 100 previously, the processor 140 may replace (update) the pre-stored first calibration data with second calibration data obtained as a result of recent calibration.

Herein, when the calibration data is obtained, the processor 140 may additionally obtain sensing data from at least one sensor, apply the obtained calibration data to the additionally obtained sensing data, and obtain the calibrated sensing data. The obtaining and storing the calibration data will be described below in detail with reference to FIGS. 4A and 4B.

In addition, if it is identified that the calibrated sensing data is improved than the sensing data before the calibration by a threshold value, the processor 140 may store the obtained calibration data in the memory 120. This will be described below with reference to FIG. 9.

In addition, when the sensing data is obtained from at least one sensor, the processor 140 may calibrate the obtained sensing data based on the calibration data stored in the memory 120 and control the driving unit 130 to provide the service based on the calibrated sensing data.

Further, the robot 100 may further include a distance sensor, and the processor 140 may identify that the robot 100 has moved to the predetermined point and then identify whether a dynamic object exists in a surrounding environment of the predetermined point based on the sensing data obtained by the distance sensor. If it is identified that the dynamic object exists in the surrounding environment, the processor 140 may end the calibration operation for the plurality of sensors 110.

In addition, the robot 100 may further include a user interface and a communication interface, and if a user command is received through at least one of the user interface or the communication interface, the processor 140 may control the driving unit 130 so that the robot 100 moves to the predetermined point.

In addition, if an event in which a traveling mode of the robot 100 has occurred after identifying that the robot 100 has moved to the predetermined point, the processor 140 may end the calibration operation for the plurality of sensors 110.

Figure 2B:
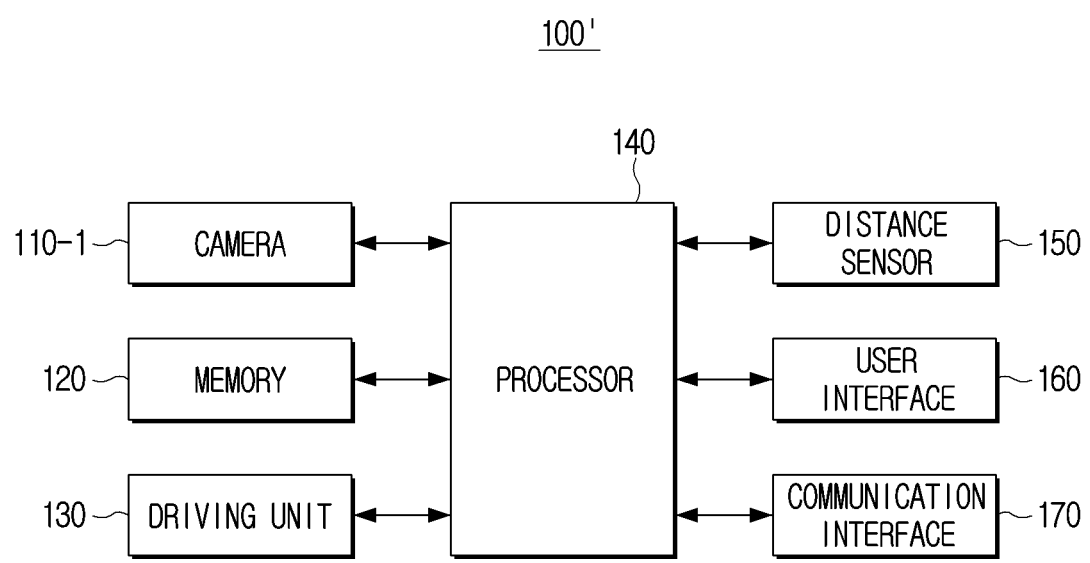
FIG. 2B is a diagram specifically illustrating a functional configuration of a robot according to an embodiment of the disclosure.

FIG. 2B is a diagram specifically illustrating a functional configuration of the robot according to an embodiment of the disclosure.

Referring to FIG. 2B, a robot 100' may include a camera (e.g., a first sensor 110-1), the memory 120, the driving unit 130, the processor 140, a distance sensor 150, a user interface 160, and a communication interface (e.g., a transceiver) 170. The detailed description of the constituent elements of FIG. 2B which are overlapped with the constituent elements of FIG. 2A will not be repeated.

The camera 110-1 may be implemented in a form of a camera module including a plurality of lenses and a plurality of image sensors. According to an example, the camera 110-1 may be a stereo camera including two lenses and two image sensors but is not limited thereto. The processor 140 may identify whether there is the mechanical distortion on the camera 110-1, and if it is identified that there is the mechanical distortion on the camera 110-1 and it is necessary to calibrate this, the processor may obtain calibration data for calibrating an image obtained by the camera 110-1 and store the calibration data in the memory 120.

The distance sensor 150 may obtain distance data. Specifically, the distance sensor 150 may measure a distance between a location of the robot 100 and a location of an object, and obtain distance data based on the measured result. The distance sensor 150 according to an example may be implemented as a light detection and ranging (LIDAR) sensor or a time of flight (TOF) sensor, but is not limited thereto.

The processor 140 may identify whether a dynamic object exists in a space within a certain range from the robot 100 based on the distance data obtained by the distance sensor 150, and if it is identified that the dynamic object exists, the processor may end the calibration operation for the camera 110-1.

The user interface 160 is a constituent element involved in performing an interaction of the robot 100 with the user. For example, the user interface 160 may include at least one of a touch sensor, a motion sensor, a button, a jog dial, a switch, a microphone, or a speaker, but is not limited thereto.

The communication interface 170 may input and output various types of data. For example, the communication interface 170 may transmit and receive various types of data with an external device (e.g., source device), an external storage medium (e.g., a USB memory), and an external server (e.g., web hard) through a communication method such as AP-based wireless-fidelity (Wi-Fi) (wireless LAN network), Bluetooth, Zigbee, wired/wireless local area network (LAN), wide area network (WAN), Ethernet, IEEE 1394, high-definition multimedia interface (HDMI), universal serial bus (USB), mobile high-definition link (MHL), Audio Engineering Society/European Broadcasting Union (AES/EBU), Optical, Coaxial, and the like.

If a user command related to the calibration for the camera 110-1 is received through at least one of the user interface 160 or the communication interface 170, the processor 140 may control the driving unit 130 so that the robot 100 moves to the predetermined point for calibration.

Figure 3A:
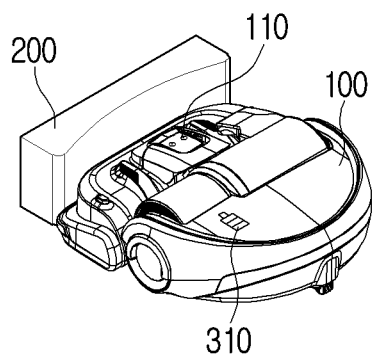
FIGS. 3A, 3B, and 3C are diagrams illustrating a predetermined point according to various embodiments of the disclosure.
Figure 3B:
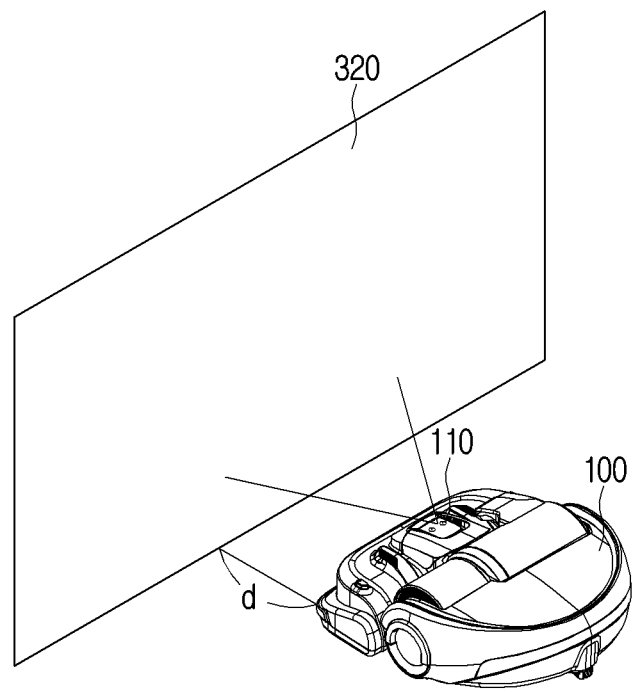
Figure 3C:
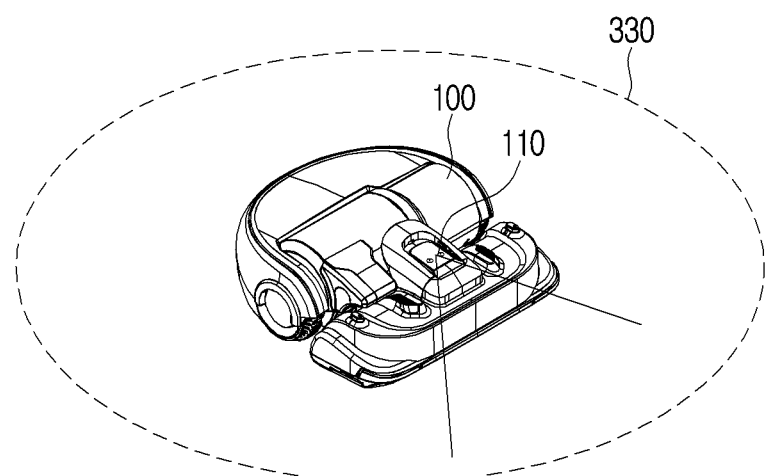

FIGS. 3A to 3C are diagrams illustrating a predetermined point according to various embodiments of the disclosure.

Referring to FIG. 3A, the robot 100 may dock at the charge station 200 and then perform the calibration for the plurality of sensors 110 simultaneously while performing the charging (which may be indicated by a power light 310). In this case, the robot 100 may orient the plurality of sensors 110 in a certain direction in a long-period stationary state. Herein, the robot 100 may perform the calibration for the plurality of sensors 110 in a state where the plurality of sensors 110 are oriented in a specific direction set based on the charge station 200. For example, the specific direction may include at least one direction of a direction facing the charge station 200 or the opposite direction thereof, but is not limited thereto.

In this case, the memory 120 may store a reference image corresponding to an object located in a direction in which the plurality of sensors 110 are oriented while the robot 100 docks at the charge station 200. Referring to FIG. 3A, the memory 120 may store the reference image corresponding to one side of the charge station 200 and the processor 140 may determine whether it is necessary to perform the calibration for the plurality of sensors 110 based on the reference image stored in the memory 120 and a plurality of images obtained through the plurality of sensors 110.

Specifically, the reference image corresponding to one side of the charge station 200 may include a depth image and the processor 140 may obtain a depth image based on the plurality of images obtained through the plurality of sensors 110 and determine whether it is necessary to perform the calibration for the plurality of sensors 110 by comparing the obtained depth image with the reference image.

Referring to FIG. 3B, the robot 100 may perform the calibration for the plurality of sensors 110 at a point spaced apart from a wall surface 320 with no features by a threshold distance d. The plurality of sensors 110 according to an embodiment may include a distance sensor, and if it is identified that the wall surface 320 is a wall surface with no complicated pattern based on an image and distance data obtained through the plurality of sensors 110, the processor 140 may control the driving unit 130 so that the robot 100 is spaced apart from the wall surface 320 by the threshold distance d. In addition, the processor 140 may control the driving unit 130 so that the plurality of sensors 110 are oriented in the direction of the wall surface 320.

In this case, the memory 120 may store a reference image corresponding to the wall surface orthogonal to the ground that is spaced apart from the robot 100 by the threshold distance d. The processor 140 may perform the calibration for the plurality of sensors 110 by comparing the reference image stored in the memory 120 with a depth image obtained by synthesizing the plurality of images obtained through the plurality of sensors 110.

Referring to FIG. 3C, if it is identified that there are no obstacles in a space of a certain range 330 from the robot 100, the robot 100 may perform the calibration for the plurality of sensors 110. If it is identified that there are no obstacles in the space of the certain range 330 from the robot 100 based on sensing data obtained through the plurality of sensors 110, the processor 140 may control the driving unit 130 to stop the robot 100 and perform the calibration for the plurality of sensors 110 based on the image obtained through the plurality of sensors 110.

In this case, the memory 120 may store a reference image corresponding to a floor surface on which the robot 100 is located. The processor 140 may perform the calibration for the plurality of sensors 110 by comparing the reference image stored in the memory 120 with the depth image obtained by synthesizing the plurality of images obtained through the plurality of sensors 110.

In FIGS. 3A to 3C, it is described that the processor 140 performs the calibration for the plurality of sensor 110 by comparing the reference image stored in the memory 120 with the depth image, but the processor 140 according to another example may determine whether it is necessary to perform the calibration for the plurality of sensors 110 without comparing the reference image with the depth image.

The processor 140 according to another example may identify a flat surface included in any one of the charge station 200, the wall surface 320 with no features, or the floor surface within the certain range 330 from the robot 100 based on the depth image obtained by synthesizing the plurality of images obtained through the plurality of sensors 110. For example, the processor 140 may identify the flat surface included in any one of the charge station 200, the wall surface 320 with no features, or the floor surface within the certain range 330 from the robot 100 based on a RANdom SAmple Consensus (RANSAC) algorithm Specifically, the processor 140 may identify a flat surface including the largest number of point clouds within the threshold distance, by repeating an operation of extracting three random point clouds among a plurality of point clouds included in the depth image, identifying a flat surface including the three extracted point clouds, and calculating the number of point clouds located within the threshold distance from the identified flat surface.

If the flat surface included in any one of the charge station 200, the wall surface 320 with no features, or the floor surface within the certain range 330 from the robot 100 is identified based on the depth image, the processor 140 may identify whether a threshold value or more of point clouds are included within the threshold range from the identified flat surface. If the threshold value or more of the point clouds are not included within the threshold range from the flat surface, the processor 140 may determine that it is necessary to perform the calibration for the plurality of sensors 110.

However, the method for determining whether it is necessary to perform the calibration is merely an example, and the processor 140 according to various embodiments of the disclosure may determine whether it is necessary to perform the calibration for the plurality of sensors 110 based on a method different from the method described with reference to FIGS. 3A to 3C.

Figure 4A:
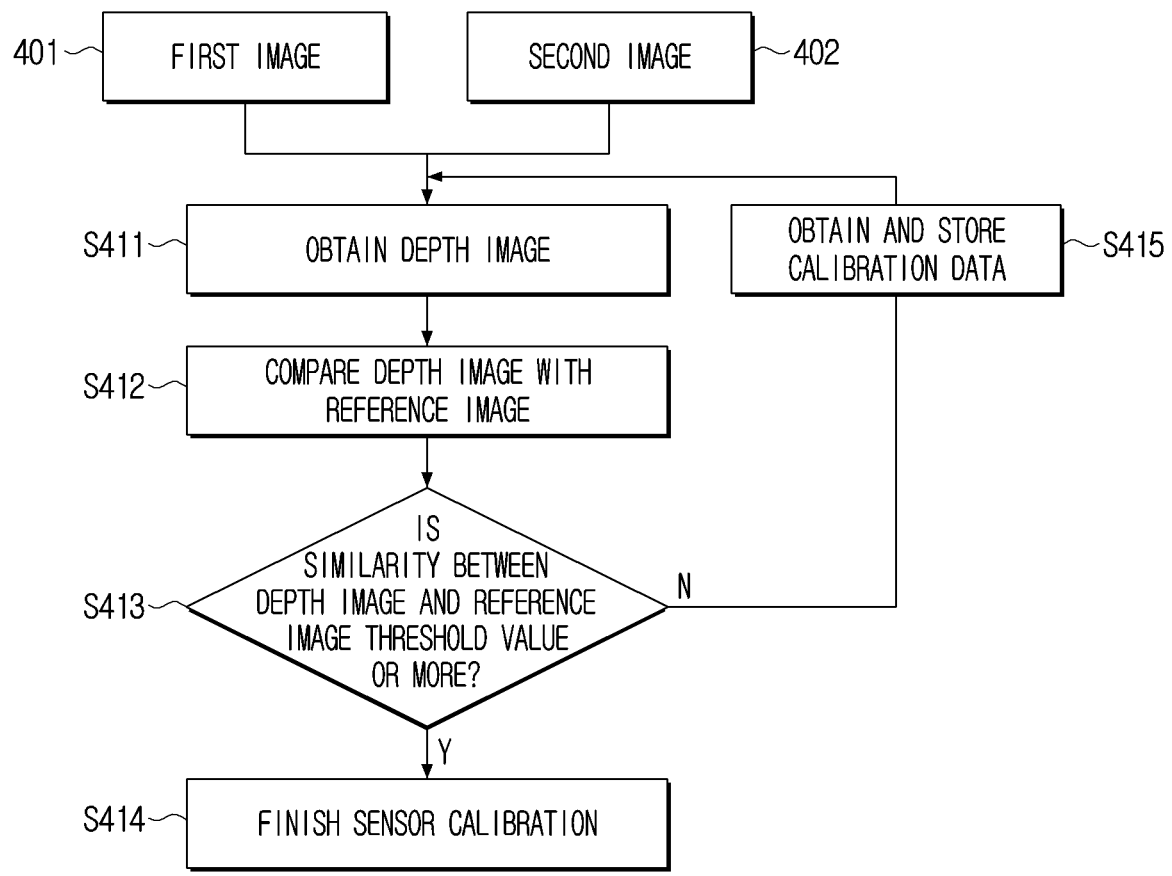
FIGS. 4A and 4B are diagrams illustrating a sensor calibration operation according to various embodiments of the disclosure.
Figure 4B:
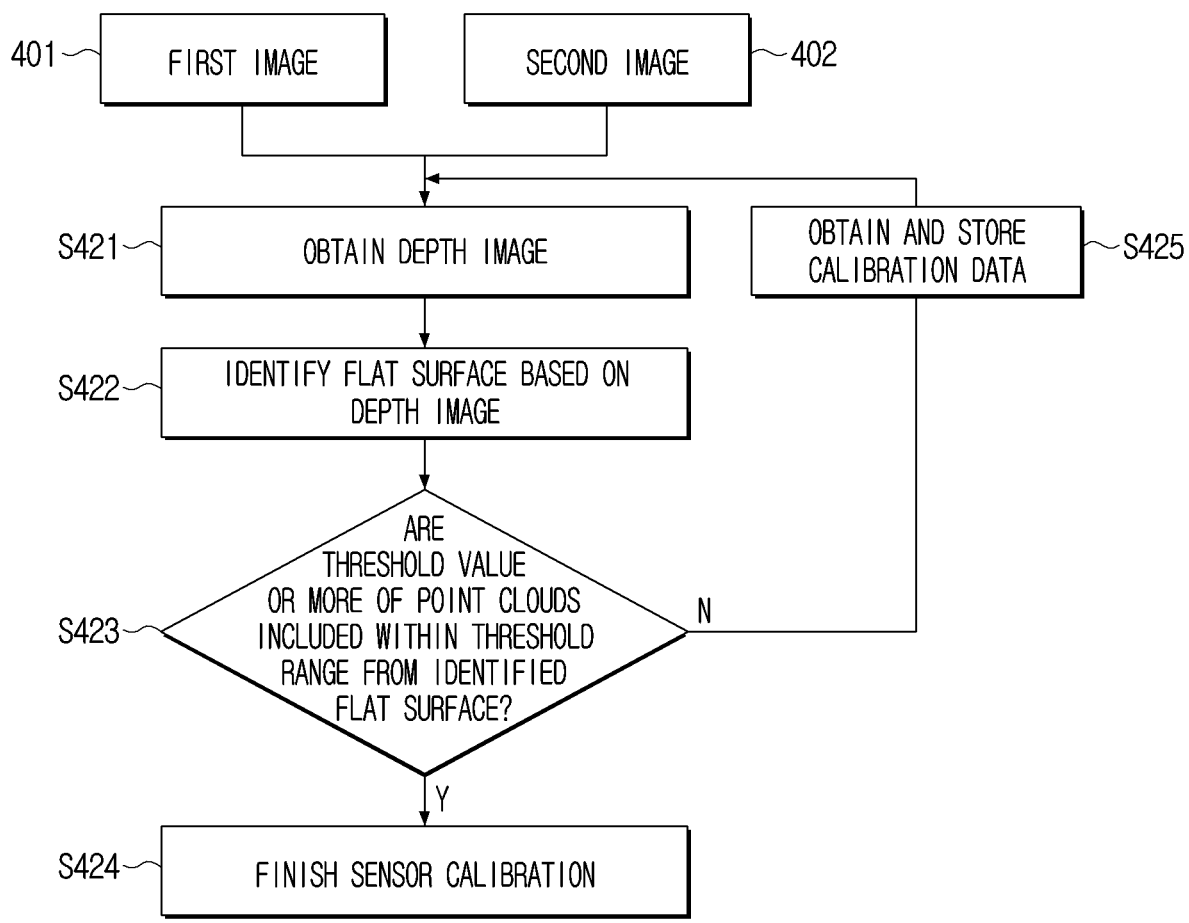

FIGS. 4A and 4B are diagrams illustrating a sensor calibration operation according to various embodiments of the disclosure.

Referring to FIGS. 4A and 4B, an operation of the robot 100 will be described by assuming that the plurality of sensors 110 includes a first camera and a second camera.

Referring to FIG. 4A, if it is identified that the predetermined event has occurred, the robot 100 according to an embodiment of the disclosure may move to the predetermined point and obtain a plurality of images through the plurality of sensors 110. In addition, the processor 140 may obtain a depth image based on a first image 401 and a second image 402 obtained through the plurality of sensors 110 at operation S411. For example, the processor 140 may obtain the depth image based on the first image 401, the second image 402, and synthesis data stored in the memory 120. Herein, the synthesis data may include a plurality of matrix data (camera matrix) including intrinsic parameters related to optical characteristics and scaling of the first camera and the second camera and extrinsic parameters related to the mechanical distortion of at least one camera of the first camera or the second camera, but is not limited thereto.

In addition, the processor 140 may compare the obtained depth image with a reference image corresponding to the predetermined point stored in the memory 120 at operation S412.

Then, the processor 140 may identify whether a similarity between the depth image and the reference image is equal to or more than the threshold value at operation S413. If the similarity between the depth image and the reference image is identified to be equal to or more than the threshold value at operation S413: Y, the processor 140 may determine that it is not necessary to perform the calibration for the plurality of sensors 110 and end the sensor calibration process at operation S414.

On the other hand, if the similarity between the depth image and the reference image is identified to be less than the threshold value at operation S413: N, the processor 140 may obtain calibration data for calibrating any one camera of the first camera or the second camera and store this in the memory 120 at operation S415. For example, the processor 140 may identify that there is the mechanical distortion on the second camera based on the first camera, and obtain the calibration data for calibrating the second camera. Herein, the calibration data may include a target value for adjusting the extrinsic parameters included in the synthesis data, but is not limited thereto.

For example, the processor 140 may adjust at least one extrinsic parameter value related to at least one of the x axis direction shift 111, the y axis direction shift 112, the z axis direction shift 113, the x axis center rotation 114, the y axis center rotation 115, and the z axis center rotation 116 described above with reference to FIG. 1B, obtain a depth image based on synthesis data with the adjusted extrinsic parameter value, the first image 401, and the second image 402, and identify an extrinsic parameter value derived with a highest similarity based on an algorithm including a process of identifying a similarity between the obtained depth image and the reference image stored in the memory 120. In addition, the processor 140 may obtain calibration data in which the identified extrinsic parameter value is used as a target value.

After obtaining the calibration data, the processor 140 may additionally obtain sensing data including images obtained through the first camera and the second camera. In addition, the processor 140 may obtain sensing data calibrated by applying the calibration data to the additionally obtained sensing data. For example, the processor 140 may adjust the extrinsic parameter included in the synthesis data based on the calibration data, and obtain sensing data calibrated based on the sensing data obtained through the second camera that is identified as requiring the calibration and the synthesis data with the adjusted extrinsic parameter.

If it is identified that the calibrated sensing data is improved than the sensing data before the calibration by the threshold value or more, the processor 140 may store the obtained calibration data in the memory 120. For example, the processor 140 may obtain a new depth image based on the sensing data obtained through the first camera and the calibrated sensing data corresponding to the second camera, and if a similarity between the new depth image and the reference image stored in the memory 120 is increased from the similarity between the existing depth image and the reference image by the threshold value or more, the processor may store the obtained calibration data in the memory 120.

Meanwhile, when the predetermined event has occurred again, the processor 140 may obtain the depth image based on the synthesis data in which the extrinsic parameter is adjusted based on the calibration data stored in the memory 120 through the above process, the first image 401, and the second image 402, and determine whether it is necessary to perform the calibration for the plurality of sensors 110 by identifying whether the quality of the obtained depth image is excellent. If it is identified again that it is necessary to perform the calibration for the plurality of sensors 110, the processor 140 may obtain new calibration data and update the calibration data obtained previously.

Referring to FIG. 4B, if it is identified that the predetermined event has occurred, the robot 100 according to another embodiment of the disclosure may move to the predetermined point and obtain a plurality of images through the plurality of sensors 110. In addition, the processor 140 may obtain the depth image based on the first image 401 and the second image 402 obtained through the plurality of sensors 110 at operation S421.

In addition, the processor 140 may identify a flat surface included in the predetermined point based on the obtained depth image at operation S422. For example, the processor 140 may identify the flat surface included in any one of the charge station 200, the wall surface with no features, or the floor surface within the certain range from the robot 100 by applying the RANSAC algorithm to the plurality of point clouds included in the depth image.

Then, the processor 140 may identify whether the threshold value or more of point clouds are included within the threshold range from the identified flat surface at operation S423. Herein, the threshold value may be a predetermined value in relation to the number of point clouds included in the threshold range from the identified flat surface or a rate of the point clouds within the threshold range from the identified flat surface among all point clouds, but is not limited thereto.

If it is identified that the threshold value or more of point clouds are included in the threshold range from the identified flat surface at operation S423: Y, the processor 140 may identify that it is not necessary to perform the calibration for the plurality of sensors 110 and end the sensor calibration process at operation S424.

On the other hand, if it is identified that the threshold value or more of point clouds are not included within the threshold range from the identified flat surface at operation S423: N, the processor 140 may obtain calibration data for calibrating any one of the first camera and the second camera and store this in the memory 120 at operation S425.

Figure 5:
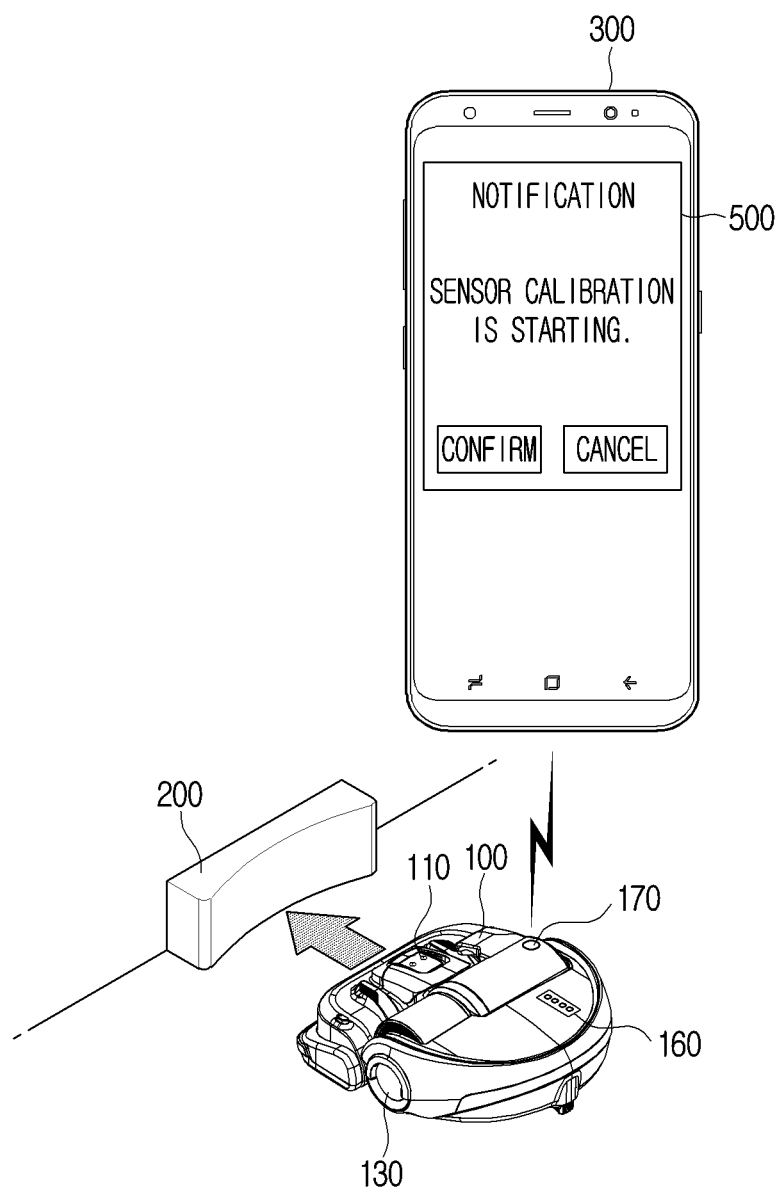
FIG. 5 is a diagram illustrating calibration performed based on a user command of the robot according to an embodiment of the disclosure.

FIG. 5 is a diagram illustrating calibration performed based on a user command of the robot according to an embodiment.

Referring to FIG. 5, the robot 100 may include the user interface 160 and the communication interface 170.

The robot 100 may receive various types of user commands related to the calibration of the plurality of sensors 110 through the user interface 160. For example, the processor 140 may receive a user command for instructing the calibration for the plurality of sensors 110 through the user interface 160 and control the driving unit 130 so that the robot 100 moves to the charge station 200 based on the received user command.

In addition, when the processor 140 receives the user command for instructing the end of calibration for the plurality of sensors 110 through the user interface 160, the processor 140 may end the calibration for the plurality of sensors 110 being performed based on the user command.

The user may input the user command related to the calibration of the plurality of sensors 110 included in the robot 100 through a user terminal 300. In this case, the user terminal 300 may display a guide graphical user interface (GUI) 500 related to the calibration for the plurality of sensors 110 and transmit a control signal corresponding to the user command to the robot 100.

The communication interface 170 may receive the control signal corresponding to the user command from the user terminal 300. When the control signal corresponding to the user command is received through the communication interface 170, the processor 140 may control the driving unit 130 so that the robot 100 moves to the charge station 200.

Accordingly, the robot 100 may perform the calibration for the plurality of sensors 110 based on the user command received through the user interface 160 or the communication interface 170, and accordingly, although the predetermined time interval or the interval in which a predetermined number of tasks has been performed has not arrived, the calibration for the plurality of sensors 110 may be performed.

Figure 6A:
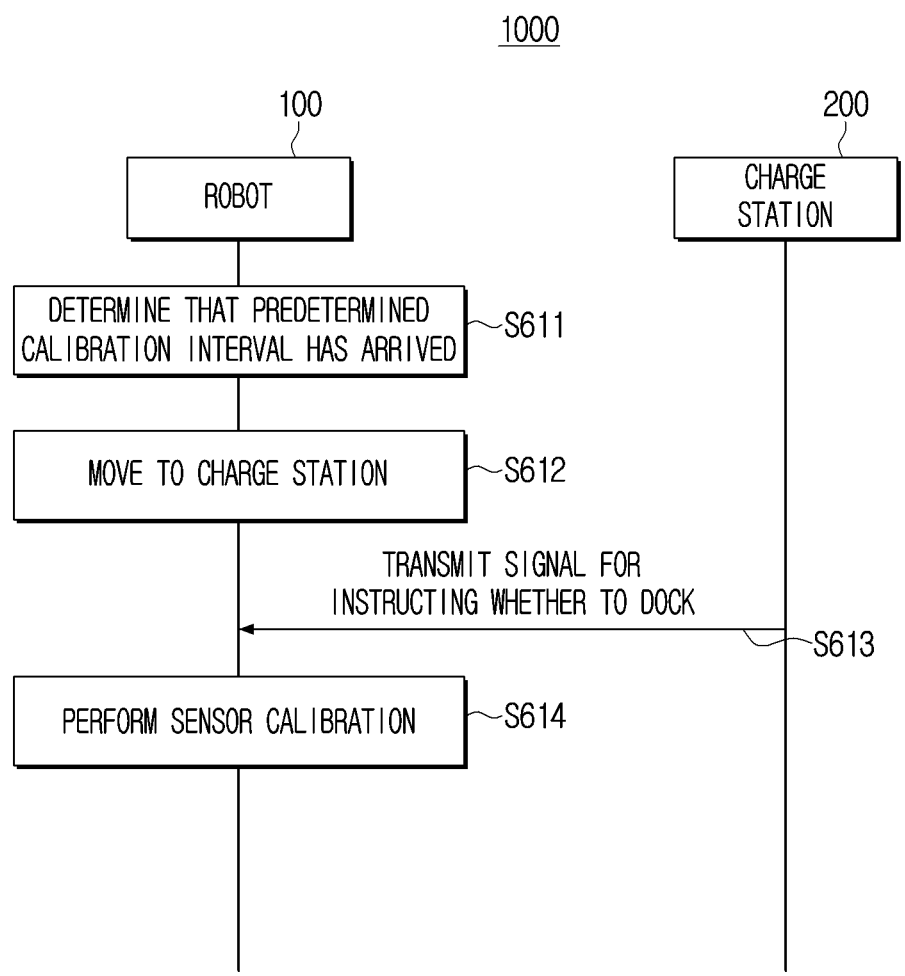
FIGS. 6A and 6B are sequence diagrams illustrating a system according to various embodiments of the disclosure.
Figure 6B:
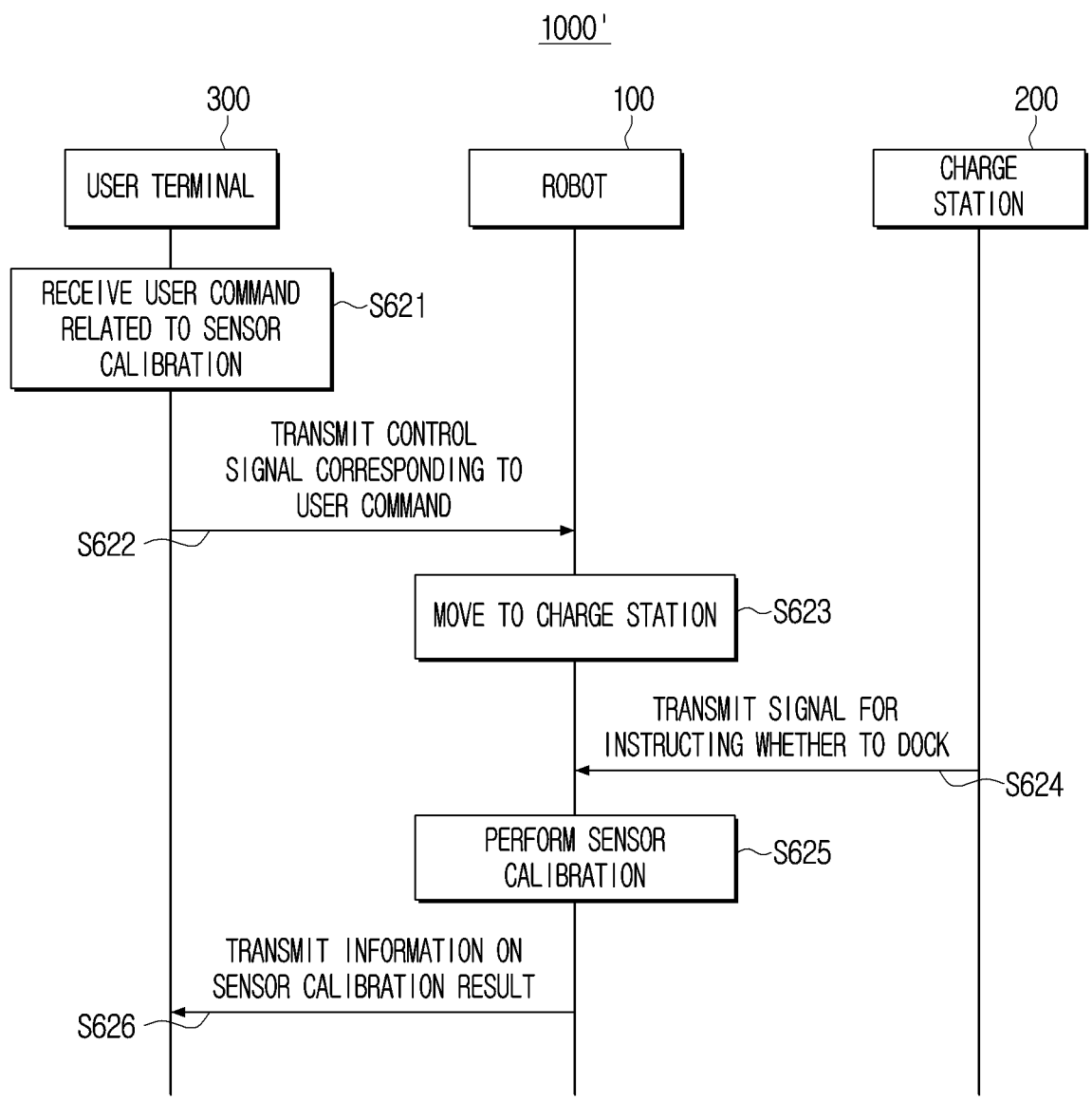

FIGS. 6A and 6B are sequence diagrams illustrating a system according to various embodiments of the disclosure.

Referring to FIG. 6A, a system 1000 including the robot 100 including the plurality of sensors 110 and the charge station 200 may perform calibration for the plurality of sensors 110 according to organic operations between the constituent elements 100 and 200.

The charge station 200 may supply power to the robot 100. Specifically, if it is identified that the robot 100 has docked at the charge station 200, the charge station 200 may supply power to the robot 100. For this, the charge station 200 may include a power supplier, a combination portion for docking of the robot 100, and a controller which controls the power supplier to supply the power to the robot 100, if it is identified that the robot 100 has docked at the combination portion, but is not limited thereto.

If it is identified that at least one of the predetermined time interval or the interval in which a predetermined number of tasks has been performed has arrived, the robot 100 according to an example may determine that the predetermined event has occurred at operation S611.

In addition, the robot 100 may move to the charge station 200 at operation S612 and dock at the charge station 200. In addition, if it is identified that the robot 100 has moved to the charge station 200, the charge station 200 may transmit a signal for instructing whether to dock to the robot 100 at operation S613 and supply the power to the robot 100.

When signal for instructing the docking is received from the charge station 200, the robot 100 may identify whether it is necessary to perform the calibration for at least one sensor of the plurality of sensors 110, and if it is identified that it is necessary to perform the calibration for the at least one sensor, the robot 100 may perform the calibration for the plurality of sensors 110 based on a plurality of images obtained from the plurality of sensors 110 at operation S614.

Referring to FIG. 6B, a system 1000' including the robot 100 including the plurality of sensors 110, the charge station 200, and the user terminal 300 may perform the calibration for the plurality of sensors 110 according to organic operations between the constituent elements 100, 200, and 300.

The user terminal 300 may be implemented as an electronic device. For example, the user terminal 300 may be implemented in various forms of a smartphone, a tablet personal computer (PC), a mobile phone, a video phone, an e-book reader, a desktop personal computer (PC), a laptop personal computer (PC), a netbook computer, a workstation, a server, a personal digital assistant (PDA), a portable multimedia player (PMP), an MP3 player, a medical device, a camera, a wearable device, or the like, but is not limited thereto.

A user terminal 300 according to an example may receive a user command related to the calibration for the plurality of sensors 110 included in the robot 100 at operation S621. The user terminal 300 may transmit a control signal corresponding to the user command to the robot 100 at operation S622.

The robot 100 may move to the charge station 200 at operation S623 and dock at the charge station 200 based on the control signal received from the user terminal 300. In addition, if it is identified that the robot 100 has moved to the charge station, the charge station 200 may transmit a signal for instructing the docking to the robot 100 at operation S624 and supply the power to the robot 100.

If the signal for instructing the docking is received from the charge station 200, the robot 100 may identify whether it is necessary to perform the calibration for at least one sensor among the plurality of sensors 110, and if it is identified that it is necessary to perform the calibration for the at least one sensor, the robot may perform the calibration for the plurality of sensors 110 based on the plurality of images obtained from the plurality of sensors 110 at operation S625.

In addition, when the calibration for the plurality of sensors 110 is completed, the robot 100 may transmit information on a sensor calibration result to the user terminal 300 at operation S626. Although not illustrated in FIG. 6B, the user terminal 300 may provide a GUI for the sensor calibration result to the user based on the information received from the robot 100.

Figure 7:
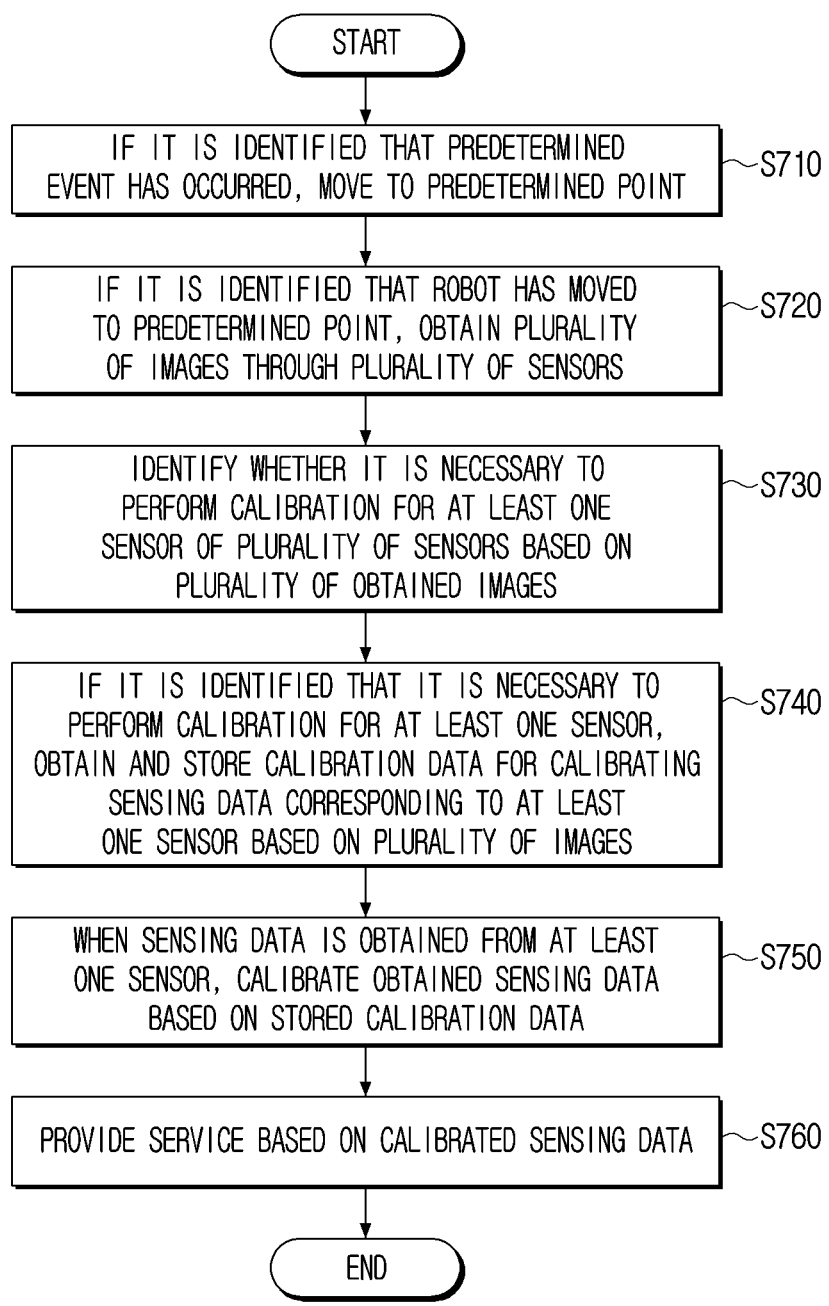
FIG. 7 is a flowchart illustrating a control method according to an embodiment of the disclosure.

FIG. 7 is a flowchart illustrating a control method according to an embodiment of the disclosure.

Referring to FIG. 7, in the control method according to an embodiment of the disclosure, if it is identified that the predetermined event has occurred, the robot is moved to the predetermined point at operation S710.

If it is identified that the robot has moved to the predetermined point, a plurality of images may be obtained through the plurality of sensors at operation S720.

It is identified whether it is necessary to perform the calibration for at least one sensor of the plurality of sensors based on the plurality of obtained images at operation S730.

If it is identified that it is necessary to perform the calibration for the at least one sensor, the calibration data for calibrating the sensing data corresponding to the at least one sensor may be obtained based on the plurality of images and stored at operation S740.

When the sensing data is obtained from the at least one sensor, the obtained sensing data may be calibrated based on the stored calibration data at operation S750.

Finally, the robot may be driven based on the calibrated sensing data at operation S760.

The identifying whether it is necessary to perform the calibration at operation S730 may include identifying whether there is a mechanical distortion on each of the plurality of sensors based on the plurality of obtained images, and based on the identifying that there is the mechanical distortion on at least one sensor of the plurality of sensors, identifying that it is necessary to perform the calibration for the at least one sensor.

In addition, the identifying whether it is necessary to perform the calibration at operation S730 may include obtaining a depth image based on the plurality of obtained images, comparing a reference image related to the predetermined point with the obtained depth image, and identifying whether it is necessary to perform the calibration for the at least one sensor of the plurality of sensors based on the comparison result.

In addition, in the moving the robot at operation S710, if it is identified that at least one of the predetermined time interval or the interval in which a predetermined number of tasks has been performed has arrived, it is identified that the predetermine event has occurred.

In the obtaining the plurality of images at operation S720, if it is identified that the robot has docked at the charge station, it may be identified that the robot has moved to the predetermined point.

The control method may further include identifying whether a dynamic object exists in a surrounding environment of the predetermined point, after identifying that the robot has moved to the predetermined point, and based on the dynamic object being identified to exist, finishing the calibration operation for the plurality of sensors.

In the moving the robot at operation S710, when a user command is received, the robot may move to the predetermined point.

In the calibrating the obtained sensing data at operation S750 may include, based on the calibration data being obtained, additionally obtaining sensing data from the at least one sensor, obtaining calibrated sensing data by applying the calibration data to the additionally obtained sensing data, and, based on the identifying that the calibrated sensing data is improved than the sensing data by a threshold value, storing the obtained calibration data in the memory.

The control method may further include, based on an event in which a traveling mode of the robot is changed occurring after identifying that the robot has moved to the predetermined point, finishing the calibration operation for the plurality of sensors.

Figure 8A:
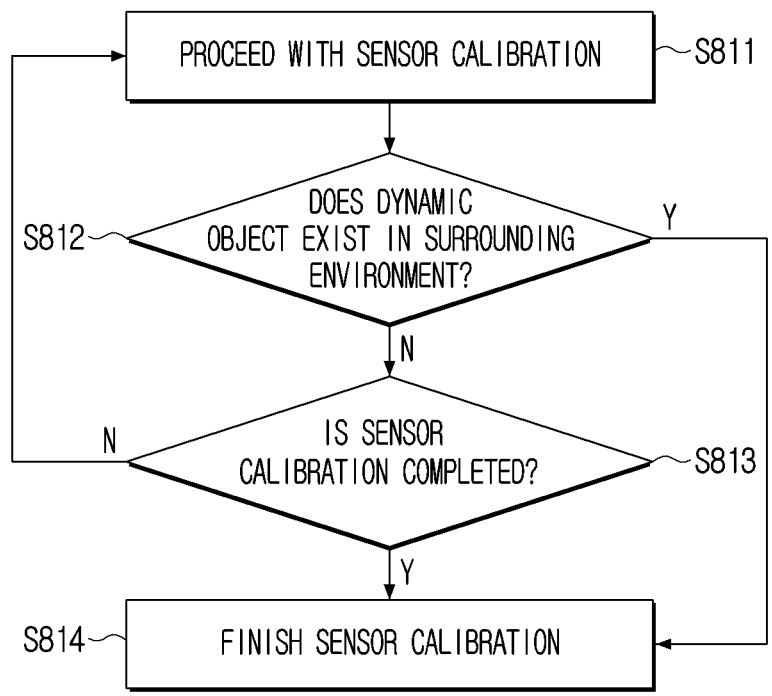
FIGS. 8A and 8B are diagrams illustrating an event that is able to occur during the sensor calibration according to various embodiments of the disclosure.
Figure 8B:
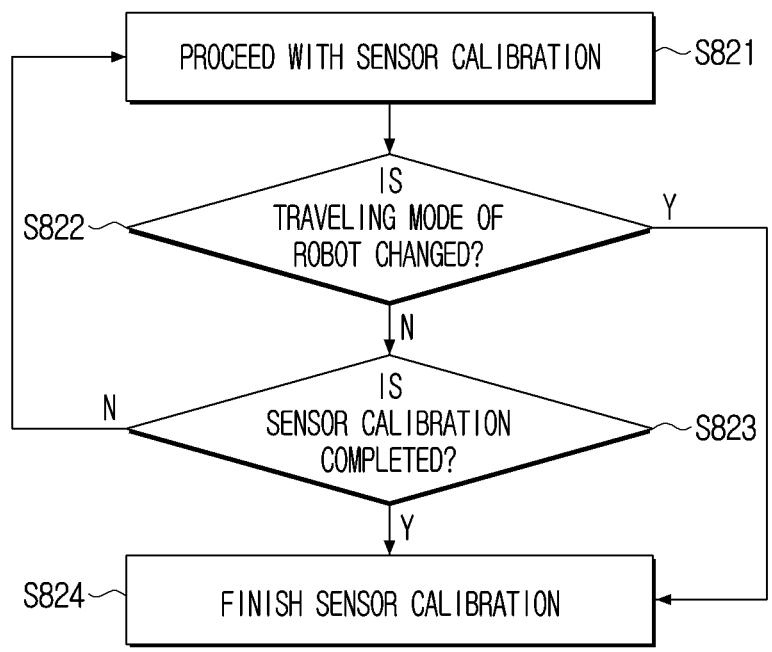

FIGS. 8A and 8B are diagrams illustrating an event that is able to occur during the sensor calibration according to various embodiments of the disclosure.

FIG. 8A is a diagram illustrating the operation of the robot for a dynamic object identification event according to an embodiment of the disclosure.

Referring to FIG. 8A, the robot 100 according to an example may further include a distance sensor. If it is identified that the predetermined event has occurred and it is identified that the robot 100 has moved to the predetermined point, the processor 140 may proceed with the calibration for the plurality of sensors 110 at operation S811.

In addition, the processor 140 may identify whether a dynamic object exists in the surrounding environment of the predetermined point based on distance data obtained by the distance sensor in the process of proceeding the calibration for the plurality of sensors 110 at operation S812. When the dynamic object exists at operation S812: Y, an accuracy of the sensor calibration may be deteriorated according to a change of a location of the robot 100 and a direction in which the plurality of sensors 110 are oriented due to the dynamic object, the processor 140 may finish the calibration while not completing the sensor calibration at operation S814.

When the dynamic object does not exist at operation S812: N, the processor 140 may perform the calibration by identifying whether it is necessary to perform the calibration for the plurality of sensors 110. The processor 140 may identify whether the calibration for the plurality of sensors 110 is completed at operation S813, and if it is identified that the calibration is completed at operation S813: Y, the processor may store the calibration data corresponding to at least one sensor of the plurality of sensors 110 in the memory 120 and finish the calibration at operation S814.

On the other hand, if it is identified that the calibration is not completed at operation S813: N, the processor 140 may identify whether the predetermined event has occurred, and if it is identified that the predetermined event has occurred, the processor may proceed the sensor calibration again at operation S811.

FIG. 8B is a diagram illustrating the operation of the robot for a traveling mode change identification event according to an embodiment of the disclosure.

Referring to FIG. 8B, in an example, the processor 140 may identify that the predetermined event has occurred, and if it is identified that the robot 100 has moved to the predetermined point, the processor may proceed the calibration for the plurality of sensors 110 at operation S821.

In addition, the processor 140 may identify whether the traveling mode of the robot 100 is changed in the process of proceeding the calibration for the plurality of sensors 110 at operation S822. If the traveling mode of the robot 100 is changed at operation S822: Y, the robot 100 needs to provide the service corresponding to the changed traveling mode, and accordingly, the processor 140 may finish the sensor calibration while not completing the sensor calibration at operation S824.

On the other hand, if the traveling mode of the robot 100 is changed at operation S822: N, the processor 140 may perform the calibration by identifying whether it is necessary to perform the calibration for the plurality of sensors 110. The processor 140 may identify whether the calibration for the plurality of sensors 110 is completed at operation S823, if it is identified that the calibration is completed at operation S823: Y, the processor may store the calibration data corresponding to the at least one sensor of the plurality of sensors 110 in the memory 120 and finish the calibration at operation S824.

On the other hand, if it is identified that the calibration is not completed at operation S823: N, the processor 140 may identify whether the predetermined event has occurred, and if it is identified that the predetermined event has occurred, the processor may proceed the sensor calibration again at operation S821.

Figure 9:
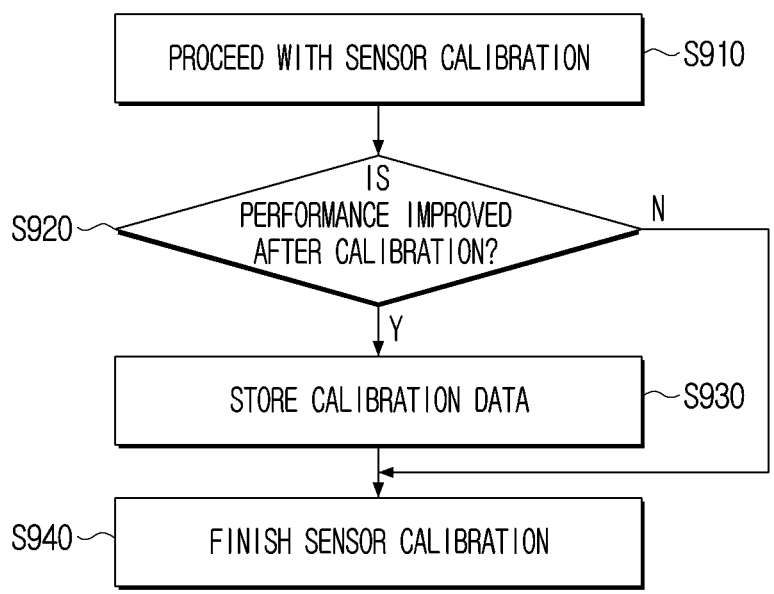
FIG. 9 is a diagram illustrating a calibration data storage operation of the robot according to an embodiment of the disclosure.

FIG. 9 is a diagram illustrating a calibration data storage operation of the robot according to an embodiment of the disclosure.

Referring to FIG. 9, if it is identified that the predetermined event has occurred and it is identified that the robot 100 has moved to the predetermined point and it is necessary to perform the calibration for at least one sensor of the plurality of sensors 110, the processor 140 may perform the calibration for the plurality of sensors 110 at operation S910.

For example, the processor 140 may obtain calibration data corresponding to at least one sensor of the plurality of sensors 110 based on a plurality of images obtained by the plurality of sensors 110, and apply the calibration data to the sensing data additionally obtained by the plurality of sensors 110.

In addition, the processor 140 may identify whether the calibrated sensing data obtained by applying the calibration data to the additionally obtained sensing data is improved compared to the existing sensing data at operation S920. For example, if a similarity between a depth image obtained based on the calibrated sensing data and a reference image stored in the memory 120 is increased compared to before the calibration by a threshold value or more, the processor 140 may determine that the calibrated sensing data is improved compared to the existing sensing data.

If it is identified that the calibrated sensing data is improved compared to the existing sensing data by the threshold value or more at operation S920: Y, the processor 140 may store the obtained calibration data in the memory 120 at operation S930 and finish the calibration for the plurality of sensors 110 at operation S940.

On the other hand, if it is not identified that the calibrated sensing data is improved compared to the existing sensing data by the threshold value or more at operation S920: N, the processor 140 may not store the obtained calibration data in the memory 120 and finish the calibration for the plurality of sensors 110 at operation S940. For example, if hardware defect related to the mechanical distortion of the at least one sensor of the plurality of sensors 110, while not related to extrinsic parameters, has occurred (e.g., damage of sensor), the processor 140 may finish the calibration for the plurality of sensors 110 without storing the obtained calibration data. In this case, the processor 140 may obtain error information for the at least one sensor of the plurality of sensors 110 and provide the obtained error information to the user.

Through the series of operations described above, if the calibration for the plurality of sensors 110 is not accurately performed or there is no significant utility obtained through the sensor calibration, the robot 100 may not finish the calibration for the plurality of sensors 110, thereby preventing unnecessary calibration.

Meanwhile, the methods according to the embodiments of the disclosure described above may be implemented in a form of an application installable in the robot of the related art.

In addition, the methods according to the embodiments of the disclosure described above may be implemented simply by the software upgrade or hardware upgrade in the robot of the related art.

Further, the embodiments of the disclosure described above may be performed through an embedded server provided in the robot or at least one external server.

The embodiments described above may be implemented in a recording medium readable by a computer or a similar device using software, hardware, or a combination thereof. In some cases, the embodiments described in this specification may be implemented as the processor 140 itself. According to the implementation in terms of software, the embodiments such as procedures and functions described in this specification may be implemented as separate software modules. Each of the software modules may perform one or more functions and operations described in this specification.

Computer instructions for executing processing operations of the robot 100 according to the embodiments of the disclosure descried above may be stored in a non-transitory computer-readable medium. When the computer instructions stored in such a non-transitory computer-readable medium are executed by the processor of a specific machine, the computer instructions of the robot 100 according to various embodiments described above may be executed by the specific machine.

The non-transitory computer-readable medium is not a medium storing data for a short period of time such as a register, a cache, or a memory, but may refer to a medium that semi-permanently stores data and is readable by a machine. Specific examples of the non-transitory computer-readable medium may include a compact disc (CD), a digital video disk (DVD), a hard disk drive, a Blu-ray disc, a USB, a memory card, and a ROM.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A robot comprising:
a plurality of sensors including a camera for sensing optical signals;
a memory configured to store a reference image;
a driving unit; and
a processor configured to:
based on identifying that a predetermined event has occurred, control the driving unit so that the robot moves to a predetermined point corresponding to the reference image, the predetermined event being related to calibration of the plurality of sensors,
based on identifying that the robot has moved to the predetermined point, obtain a plurality of images through the plurality of sensors,
obtain a similarity between the reference image and the obtained plurality of images,
identify whether it is necessary to perform calibration for at least one sensor of the plurality of sensors based on similarity between the reference image and the obtained plurality of images,
based on the similarity being equal to or less than a threshold value, obtain calibration data to calibrate sensing data corresponding to the at least one sensor based on the plurality of images and store the obtained calibration data in the memory,
based on the sensing data being obtained from the at least one sensor, calibrate the obtained sensing data based on the calibration data stored in the memory, and
control the driving unit based on the calibrated sensing data.

2. The robot of claim 1, wherein the processor is further configured to:
identify whether there is a mechanical distortion on at least one of the plurality of sensors based on the plurality of obtained images; and
based on identifying that there is the mechanical distortion on the at least one sensor of the plurality of sensors, identify that it is necessary to perform calibration for the at least one sensor.

3. The robot of claim 1,
wherein the processor is further configured to:
obtain a depth image based on a synthesis of the plurality of obtained images,
compare the reference image with the obtained depth image, and
identify whether it is necessary to perform the calibration for the at least one sensor of the plurality of sensors based on a result of the comparison.

4. The robot of claim 1, wherein the processor is further configured to:
obtain a depth image based on a synthesis of the plurality of obtained images;
identify a flat surface based on the depth image; and
identify whether it is necessary to perform the calibration for the at least one sensor of the plurality of sensors based on the identified flat surface.

5. The robot of claim 4, wherein the processor is further configured to identify the flat surface including a largest number of point clouds within a threshold distance of the robot by:
repeatedly extracting three random point clouds among a plurality of point clouds included in the depth image;
identifying a flat surface including the three extracted point clouds; and
calculating a number of point clouds located within the threshold distance from the identified flat surface.

6. The robot of claim 1, wherein the processor is further configured to, based on identifying that a predetermined time interval has elapsed or that an interval in which a predetermined number of tasks have been performed has arrived, identify that the predetermined event has occurred.

7. The robot of claim 1, wherein the processor is further configured to, based on identifying that the robot has docked at a charge station, identify that the robot has moved to the predetermined point.

8. The robot of claim 1, further comprising:
a distance sensor,
wherein the processor is further configured to:
  identify whether a dynamic object exists in a surrounding environment of the predetermined point based on sensing data obtained by the distance sensor, after identifying that the robot has moved to the predetermined point, and
  based on identifying that the dynamic object exists, finish a calibration operation for the plurality of sensors.

9. The robot of claim 1, wherein the processor is further configured to:
  identify whether any obstacles are within a specified range from the robot; and
  perform the calibration if it is identified that there are no obstacles within the specified range from the robot.

10. The robot of claim 1, further comprising:
a user interface; and
a communication interface,
wherein the processor is further configured to, based on a user command being received through at least one of the user interface or the communication interface, control the driving unit so that the robot moves to the predetermined point.

11. The robot of claim 1, wherein the processor is further configured to:
  based on the calibration data being obtained, additionally obtain sensing data from the at least one sensor;
  obtain calibrated sensing data by applying the calibration data to the additionally obtained sensing data; and
  based on identifying that the calibrated sensing data is improved compared to the sensing data by a threshold value or more, store the obtained calibration data in the memory.

12. The robot of claim 1, wherein the processor is further configured to, based on an event in which a traveling mode of the robot is changed occurring after identifying that the robot has moved to the predetermined point, finish a calibration operation for the plurality of sensors.

13. A system comprising:
a robot comprising a plurality of sensors including a camera for sensing optical signals; and
a user terminal,
wherein the user terminal is configured to, based on a user command for performing calibration for the plurality of sensors provided in the robot being input, transmit the user command to the robot; and
wherein the robot is configured to:
  based on the user command being received from the user terminal, obtain a similarity between a reference image stored in the robot and a plurality of images, identify whether it is necessary to perform calibration for at least one sensor of the plurality of sensors based on similarity between the plurality of images obtained from the plurality of sensors and the reference image for calibrating the at least one sensor while the robot moves to a predetermined point corresponding to the reference image for calibrating the at least one sensor and is located at the predetermined point, and
  based on the similarity being equal to or less than a threshold value, obtain calibration data for calibrating sensing data corresponding to the at least one sensor based on the plurality of images and store the obtained calibration data in a memory.

14. A method for controlling a robot including a camera for sensing optical signals and storing a reference image, the method comprising:
  based on identifying that a predetermined event has occurred, moving the robot to a predetermined point corresponding to the reference image, the predetermined event being related to calibration of the plurality of sensors;
  based on identifying that the robot has moved to the predetermined point, obtaining a plurality of images through a plurality of sensors;
  obtaining a similarity between the reference image and the obtained plurality of images,
  identifying whether it is necessary to perform calibration for at least one sensor of the plurality of sensors based on similarity between the reference image and the obtained plurality of images;
  based on the similarity being equal to or less than a threshold value, obtaining and storing calibration data to calibrate sensing data corresponding to the at least one sensor based on the plurality of images;
  based on the sensing data being obtained from the at least one sensor, calibrating the obtained sensing data based on the stored calibration data; and
  driving the robot based on the calibrated sensing data.

15. The method of claim 14, wherein the identifying of whether it is necessary to perform the calibration comprises:
  identifying whether there is a mechanical distortion on at least one of the plurality of sensors based on the plurality of obtained images; and
  based on identifying that there is the mechanical distortion on the at least one sensor of the plurality of sensors, identifying that it is necessary to perform the calibration for the at least one sensor.

16. The method of claim 14, wherein the identifying of whether it is necessary to perform the calibration comprises:
  obtaining a depth image based on a synthesis of the plurality of obtained images;
  comparing the reference image with the obtained depth image; and
  identifying whether it is necessary to perform the calibration for the at least one sensor of the plurality of sensors based on a comparison result.

17. The method of claim 14, wherein the identifying of whether it is necessary to perform the calibration comprises:
  obtaining a depth image based on a synthesis of the plurality of obtained images;
  identifying a flat surface based on the depth image; and
  identifying whether it is necessary to perform the calibration for the at least one sensor of the plurality of sensors based on the identified flat surface.

18. The method of claim 17, further comprising:
  identifying the flat surface including a largest number of point clouds within a threshold distance of the robot;
  repeatedly extracting three random point clouds among a plurality of point clouds included in the depth image;
  identifying a flat surface including the three extracted point clouds; and
  calculating a number of point clouds located within the threshold distance from the identified flat surface.

19. The method of claim 14, wherein the moving of the robot comprises, based on identifying that at least one of a predetermined time interval or an interval in which a predetermined number of tasks has been performed has arrived, identifying that the predetermined event has occurred.

20. The method of claim 14, wherein the obtaining of the plurality of images comprises, based on identifying that the robot has docked at a charge station, identifying that the robot has moved to the predetermined point.

\* \* \* \* \*